US006062747A

United States Patent [19]

Earle et al.

[11] Patent Number: 6,062,747

[45] Date of Patent: May 16, 2000

[54] CLIP

[75] Inventors: Anthony Earle, Harrow Weald; Leslie R. Wells, Brentford, both of United Kingdom; Joachim P. Simon, Erkrath, Germany

[73] Assignee: Eastman Kodak Company, Rochester, N.Y.

[21] Appl. No.: 09/020,729

[22] Filed: Feb. 9, 1998

[30] Foreign Application Priority Data

Feb. 14, 1997 [GB] United Kingdom .................... 9703034

[51] Int. Cl.[7] .................................................. G03B 1/56

[52] U.S. Cl. ........................................................ 396/652

[58] Field of Search ................................. 396/651, 652; 226/91, 92, 163, 170, 173; 24/345, DIG. 8

[56] References Cited

U.S. PATENT DOCUMENTS

| | | | |
|---|---|---|---|
| 2,878,924 | 3/1959 | Dye et al. . | |
| 4,065,042 | 12/1977 | Zielinsky | 396/652 |
| 4,279,371 | 7/1981 | Laar et al. | 226/91 |
| 4,330,191 | 5/1982 | Rawlings et al. | 396/652 |

FOREIGN PATENT DOCUMENTS

| | | |
|---|---|---|
| 8907941 U1 | 11/1989 | Germany . |
| 38 33 469 | 4/1990 | Germany . |

*Primary Examiner*—D. Rutledge
*Attorney, Agent, or Firm*—David A. Novais

[57] ABSTRACT

A clip for attaching an end of a web to a drive belt. The clip comprises an elongate mount for receiving an end of the web, and an attachment section for securing the clip to the belt. The attachment section comprises two spaced pairs of claws for gripping the drive belt such that the drive belt and the web are substantially parallel and a flexible support connecting the two spaced pairs of claws providing flexibility in the direction of travel, such that, in use, the flexible support can deform to conform to the path of the drive belt as the drive belt passes through a processing apparatus. The resulting clip is easy to use, reliable during use and easily removed from the drive belt at the end of a processing operation.

20 Claims, 5 Drawing Sheets

CLIP

FIELD OF THE INVENTION

This invention relates to clips, and in particular to clips for attaching photographically sensitized webs to a drive belt of a photographic processing apparatus.

BACKGROUND OF THE INVENTION

Large wholesale processing machines which process photographically sensitized webs are well known. These machines can be run at speeds of up to 50 meters per minute depending on the number of tanks through which the web must pass to be processed. Further, such machines can be sufficiently wide to accommodate up to six separate webs moving in parallel through the machine. Most of these machines are individually configured from standard components to suit individual laboratory requirements.

Recent developments have shown that the chemical volume of the prior art large volume tank processing machines described above can be reduced by up to 90%. Such a low volume thin tank (LVTT) type apparatus is disclosed in U.S. Pat. Nos. 5,179,404; 5,311,235; 5,309,191; 5,339,131 and 5,387,499. A limit to the maximum practical volume reduction is dependent upon the space needed for reliable transport of the webs through the tanks and the efficient recirculation and/or replacement of the chemicals used in the tanks.

As a result of reducing the volumes of tanks in a processing apparatus, new chemical formulations (such as Redox Amplification (RX) formulations) can be used which shorten the time of the various processing steps occurring in the tanks, thereby leading to increases in the line speed of the processing apparatus.

In general, a photographic processing apparatus includes a continuous drive belt which follows the route of the photographically sensitized webs through the tanks of the apparatus to drive various rollers of the apparatus. To enable an end (or leader) of a photographically sensitized web to be carried through the tanks of the processing apparatus, it is normal to use a clip to join the end of the web to a drive belt such that the web travels with and in parallel to the drive belt through the processing tanks. The most common type of prior art leader clip is shown in FIG. 1.

The prior art clip shown in FIGS. 1A and 1B consists of two parts which are spot welded together. One part is a long arm defining a slot and the other part is a metal strip having ends which are bent to form claws for gripping a drive belt. In use, an end of a photographically sensitized web is folded through the slot and a drive belt is inserted between the claws of the clip. While these prior art clips are easy to attach to a moving drive belt, any drag occurring to the web causes the clip to be pulled out of square relative to the drive belt. If this occurs, as the clip passes around a top or bottom roller of the apparatus, bending of the clip can result. In most cases, some bending of the clip can be tolerated in a typical prior art large volume processing apparatus because there is room in the tanks to accommodate the effective increase in size of the clip. However, this is not the case in an LVTT processing apparatus and the clip may jam in the narrow processing channel defined between the rack and the tank and stop the machine.

The prior art clips shown in FIGS. 1A and 1B sometimes actually disengage from the drive belt within a tank of a processing apparatus. Although this results in causing waste product, if this occurs in a LVTT type apparatus it is also necessary to dismantle at least part of the machine to retrieve the clip immediately, since there is not sufficient room in a processing tank for a new clip to pass a clip lying at the bottom of the tank.

U.S. Pat. No. 4,279,371 discloses a one-piece hairpin-type holding element with two brackets welded to end portions of the element. Although the two brackets result in improved retention on a drive belt, the hairpin holding element does not define a closed slot spaced from the drive belt for photographically sensitized web. Further, the complete clip is too rigid for use in a LVTT type processing system since it has been found that the two brackets do not travel smoothly around a roller at the bottom of a processing tank.

Another known prior art type clip is shown in FIGS. 2A and 2B of the accompanying drawings. As can be seen, this clip is similar to that of FIGS. 1A and 1B, but has three claws for engaging a drive belt. Each claw is riveted or otherwise fastened to a flexible support which is riveted or otherwise fastened to the long arm part of the clip. This clip, however, is not entirely secure on a drive belt and often disengages, bends or moves out of square in a processing tank, resulting in jamming of the apparatus. It also suffers from an extra problem at the outlet end of the processing apparatus. In this regard, when a clip exits the last tank of the apparatus, the web is accumulated on a winder and it is necessary to remove automatically the clip from the drive belt. A wedge shaped finger is generally used, which slides between the drive belt and the clip causing the clip to disengage from the belt. However, the three claw clip of FIGS. 2A and 2B often only disengages from one claw and then twists diagonally on the belt and can cause damage.

As will be appreciated, a number of different types of leader clips are known. However, prior to the present invention, a truly satisfactory clip for use in a LVTT processing apparatus has not been known. The present invention provides such a clip.

SUMMARY OF THE INVENTION

An object of the present invention is to provide for a clip for attaching an end of a web to a drive belt. The clip comprises an elongate mount for receiving an end of the web, and an attachment section for securing the clip to the belt. The attachment section comprises two spaced pairs of claws for gripping the drive belt such that the drive belt and web are substantially parallel and a flexible support connecting the two spaced pairs of claws providing flexibility in the direction of travel, such that, in use, the flexible support can deform to conform to the path of the drive belt as the drive belt passes through the apparatus.

By providing a four claw clip having a flexible support, the clip is able to bend as it passes through a processing apparatus while staying correctly positioned and aligned on the drive belt of the apparatus. Problems associated with twisting of the clip and jamming of the apparatus are minimized and/or avoided, while still allowing easy removal of the clip from the drive belt at the end of the processing apparatus.

One end of the elongate mount is attached to the attachment section and the other end of the elongate mount is preferably tapered and/or rounded. As a result, smoother running of the clip through a tank of a processing apparatus can occur, because the free end of the elongate mount does not catch or otherwise snag as the clip passes around a roller at the lower end of the tank. Deformation and/or bending of the elongate mount is thereby avoided.

It may be advantageous to construct at least a part of the clip from a magnetic material so that if the clip should become dislodged within the processing apparatus it can be easily retrieved by magnetic means.

Preferably the elongate mount is attached to the attachment section substantially midway between the two pairs of claws. More even spreading of the load on the claws is thereby achieved. In theory, however, an improved clip would still be provided if the elongate mount is attached to the attachment section adjacent one of the pairs of claws.

The elongate mount may be attached to the attachment section by studs or spot welds passing through the flexible support which engage the elongate mount and a reinforcing plate. Other appropriate means for attaching the elongate mount to the attachment section will occur to those skilled in the relevant art.

In a preferred embodiment, each pair of claws is carried by a support plate. If so, the support or reinforcing plate is preferably attached to one face of the flexible support and the claws extend in front of the same face of the flexible support. As a result, a more compact clip is produced.

The flexible support may include a row of apertures which increases the flexibility of the support between the pairs of claws.

Preferably the claws are inclined from the flexible support. If this is the case, the drive belt is preferably slightly wider than the internal width of each pair of claws such that, in use, the drive belt bows slightly from the flexible support. More particularly, the claws are preferably inclined from the flexible support at an angle which corresponds substantially to the angle of bow of the drive belt.

In a preferred embodiment, the elongate mount includes a closed slot for receiving an end of a web. Other means for attaching a web to the elongate mount may alternatively be used, if appropriate.

In another aspect of the present invention, there is provided a photographically sensitized web processing apparatus comprising at least one processing tank, guide means for guiding a drive belt and a web through the tank and a clip for attaching the web to the drive belt. In such an apparatus, the flexibility of the flexible support and the flexibility of the drive belt are preferably substantially the same. More particularly, in an even more preferred embodiment, the material of the drive belt and the material of the flexible support are the same.

Preferably a rack supports the guide means and forms, with the tank, a narrow processing channel therebetween for the web through the tank. More preferably, the narrow processing channel is a processing channel of a LVTT processing apparatus.

The processing channel is preferably wider around the guide means than elsewhere in the tank. As a result, the tank may have a bulbous lower end when viewed in cross-section as described in U.S. patent application Ser. No. 08/799,161 filed Feb. 14, 1997, now U.S. Pat. No. 5,835,812.

Preferably the guide means are rollers. Other appropriate means could, however, alternatively be used, if appropriate.

Nozzles are preferably provided for discharging processing solution into the processing channel formed between the tank and the rack and the processing channel is preferably narrower adjacent these nozzles, as described in U.S. patent application Ser. No. 08/799,162 filed Feb. 14, 1997, now U.S. Pat. No. 5,761,564. Improved processing of a photographically sensitized web passing through the tank can thereby occur.

Although the nozzles are preferably formed on the rack, they could be formed on the surface of a tank wall.

In a preferred embodiment, the drive belt runs in a channel formed in the rack. Further, the channel in the rack may be sufficiently large to accommodate the claws of the clip. In this way, the processing channel can be kept as clear as possible.

The tank is preferably reinforced with a honeycomb structure outer wall. As a result, the pressures within the tank do not result in deformation of the tank.

BRIEF DESCRIPTION OF THE DRAWINGS

Specific embodiments of the present invention are now described, by way of example only, with reference to the accompanying drawings, in which.

DETAILED DESCRIPTION OF THE INVENTION

Figure 3:
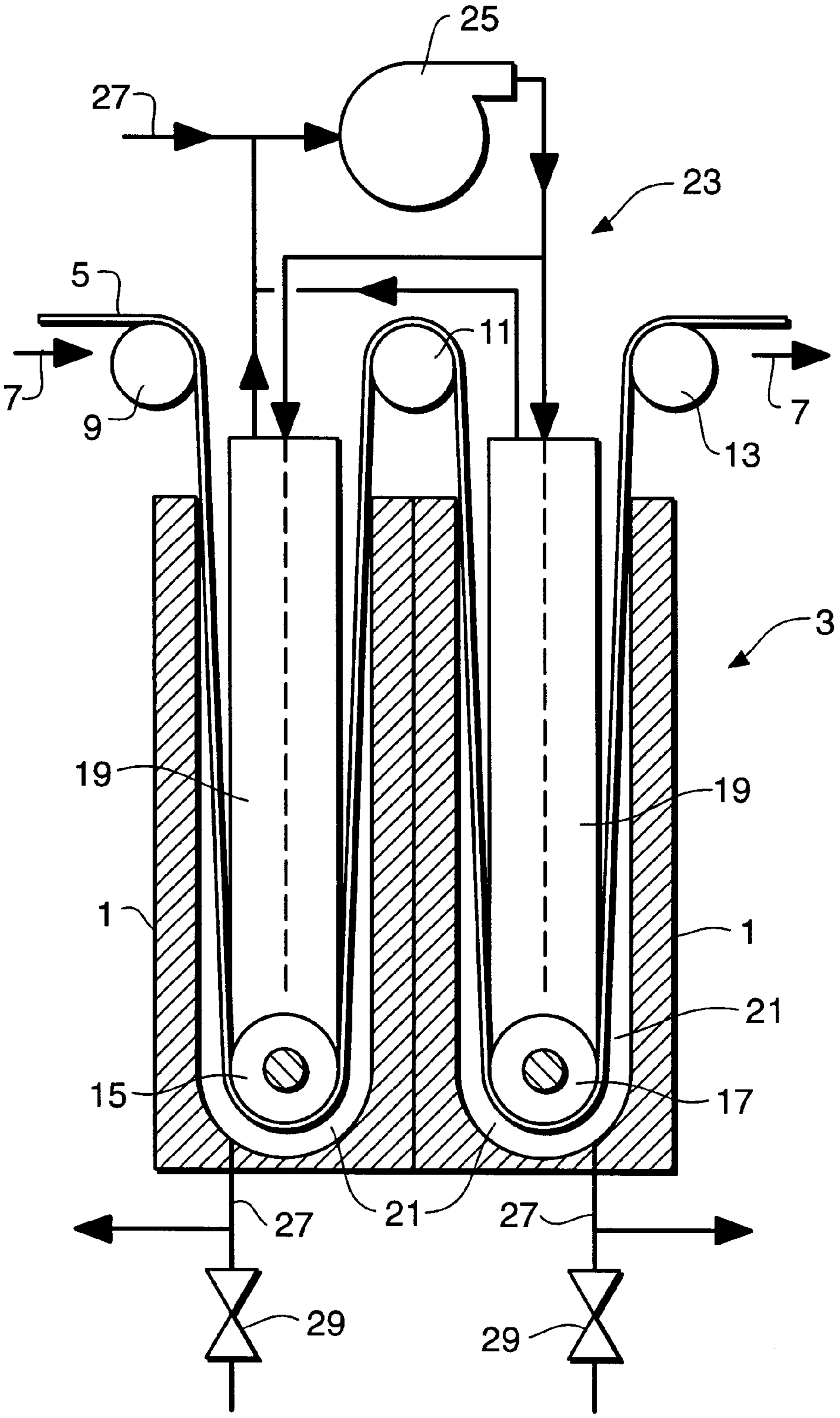
FIG. 3 is a schematic side sectional view of a low volume thin tank photographic processing apparatus.

With reference to FIG. 3 of the drawings, two tanks 1 of a low volume thin tank (LVTT) processing apparatus 3 are shown. The number of tanks 1 to be employed depends upon the number of chemical formulations and washes required to process correctly a photographically sensitized web 5 passing through the apparatus 3.

As can be seen, the web 5 and drive belt 53 (not shown in this Figure) pass through each tank 1 in the direction of arrows 7. Upper rollers 9,11,13 guide the web 5 and belt 53 between the tanks 1 and lower rollers 15,17 guide the web 5 and belt 53 within the tanks 1. The lower rollers 15,17 are supported towards the bottom of each tank by a rack 19 of the kind shown in FIG. 4, for example. As will be appreciated, the rack 19 fills a significant portion of the tank 1, thereby forming a thin processing channel 21 between the tank and rack. It is through this small thin channel 21 that the web 5 and belt 53 pass during treatment.

FIG. 3 also shows a basic plumbing system 23 including a pump 25 for providing chemical solutions to the channel 21 via the racks 19. A bottom outlet 27 is also provided from each tank 1 through which fluid can be either recirculated via pump 25 back into the tank 1 or allowed to drain out of the system via valve 29.

Figure 4:
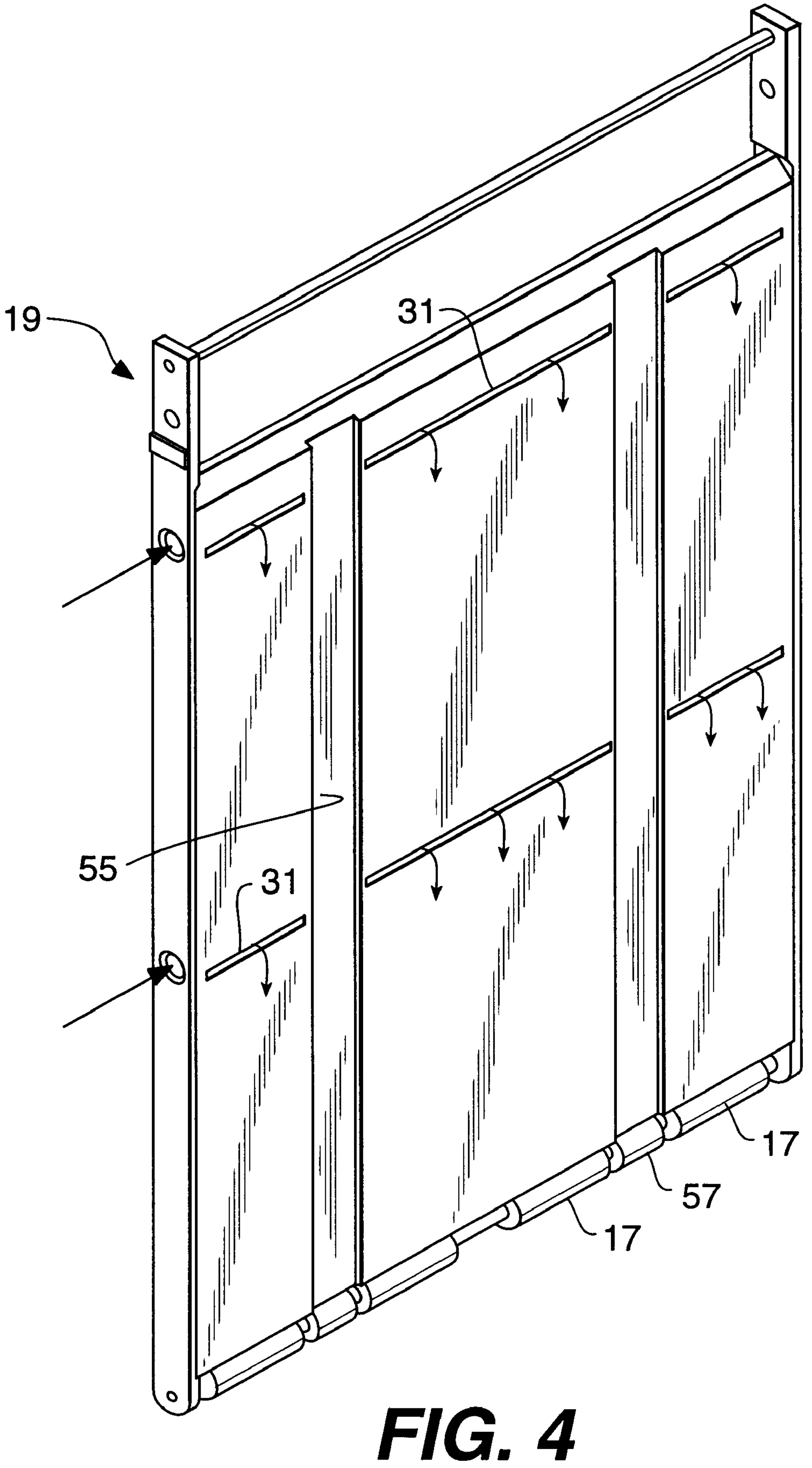
FIG. 4 is a perspective view of a rack for insertion in a tank to produce a LVTT processing apparatus of the kind shown in FIG. 3.

As can be seen in FIG. 4, the rack 19 includes a plurality of discharge slots 31 through which the chemical solutions are pumped by the pump 25 into contact with a photographically sensitized web 5 passing through the processing apparatus 3. Although not shown in the drawings, the discharge slots 31 may be formed in raised mounds on the face of the rack 19 so that the discharge slots 31 are in closer proximity to the web 5 than the remainder of the rack 19. More efficient processing of the web 5 can thereby result.

Figure 1A:
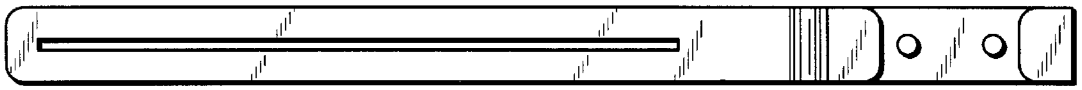
FIG. 1A (PRIOR ART)
FIGS. 1A and 1B respectively show a plan view and side view of a first embodiment of a prior art clip.
Figure 1B:
FIG. 1B (PRIOR ART)
Figure 2A:
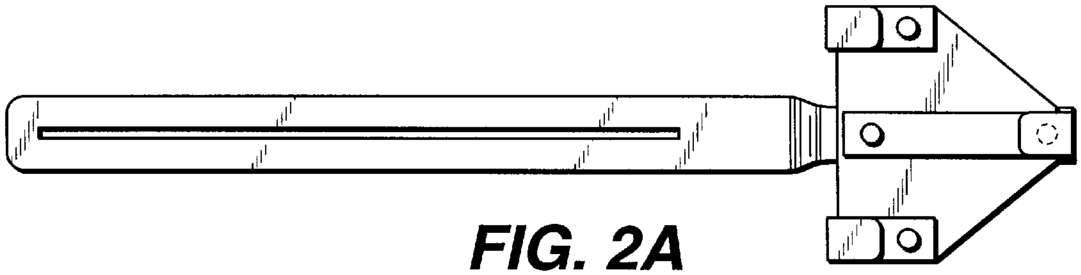
FIG. 2A (PRIOR ART)
FIGS. 2A and 2B respectively show a plan view and side view of a second embodiment of a prior art clip.
Figure 2B:
FIG. 2B (PRIOR ART)
Figure 5A:
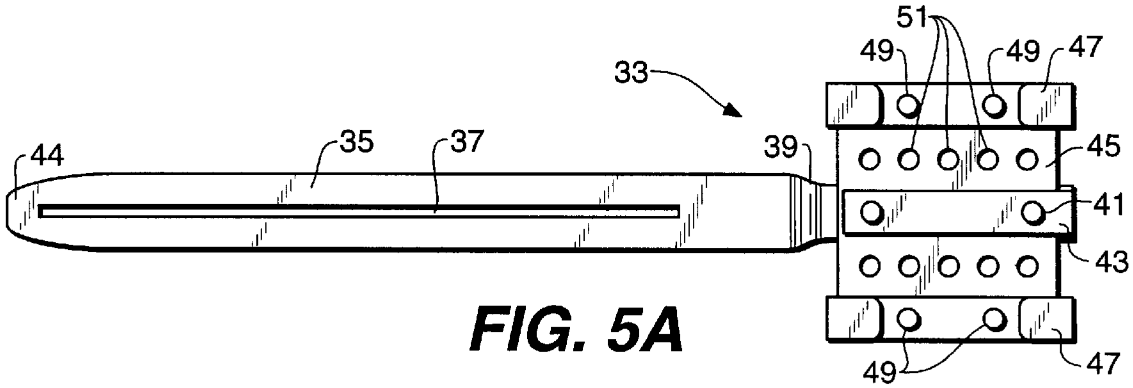
FIGS. 5A and 5B are respectively a plan view and side view of a clip according to the present invention.
Figure 5B:

Turning now to FIGS. 5A and 5B of the drawings, a leader clip 33 according to the present invention comprises an elongate mount 35 defining a closed slot 37 for a web 5. The elongate mount 35 includes a cranked neck 39 prior to being attached by rivets 41 (or spot welds) to a reinforcing plate 43. The free end 44 of the elongate mount 35 is slightly tapered and/or rounded to assist in preventing the elongate mount 35 from catching or otherwise snagging as the clip 33 passes around the lower rollers 15,17 within the tank 1. A flexible support 45 is held by the rivets 41 between the reinforcing plate 43 and the elongate mount 35. The flexible support 45 carries, at each outer edge, a pair of claws 47 which are attached to the flexible support 45 by rivets 49 (or spot welds) and, if necessary, reinforcing plates (not shown). A series of holes 51 are formed in the flexible support between each pair of claws 47 and the elongate mount 35 to provide increased flexibility thereto, if required.

Figure 6:
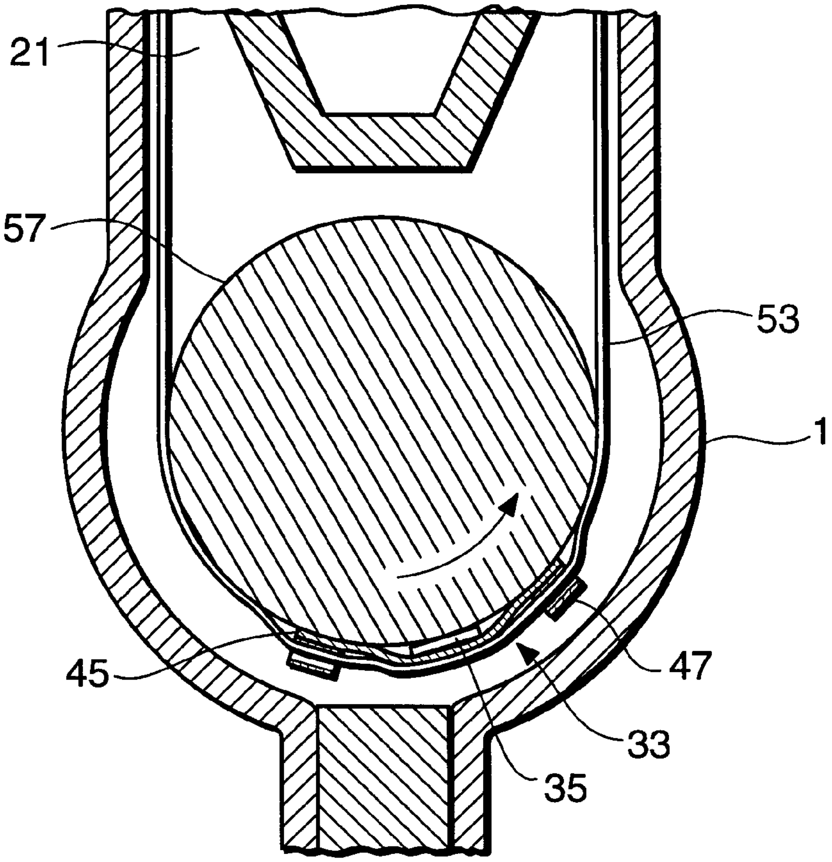
FIG. 6 is a sectional side view of a lower end of a tank of a LVTT processing apparatus showing the clip of FIGS. 5A and 5B in use.

After a web 5 has been entered through the slot 37 of the elongate mount 35 and secured by suitable folding, the claws 47 of the clip 33 are applied to a drive belt 53 of the processing apparatus 3. The drive belt 53 runs in grooves 55 formed in each face of the racks 19, as shown in FIG. 4. Further, the drive belt 53 travels around a guide roller 57 as shown in FIG. 6. Also shown in FIG. 6 is the clip 33 mounted on the drive belt 53. Due to the flexibility of the flexible support 45, the clip 33 is able to conform to the path of the drive belt 53 even when it is moving around the roller 57. As a result, the clip 33 does not twist or detach from the drive belt 53 during use, and a more reliable clip 33 results.

As can also be seen in FIG. 6, the lower end of the tank 1 is bulbous around the guide roller 57. By enlarging slightly the tank 1 around the roller 57, the clip 33 is less likely to contact the tank wall and the width of the processing channel 21 above the roller 57 can be kept at a minimum. Thus, an even smaller volume of processing solution is required.

Figure 7:
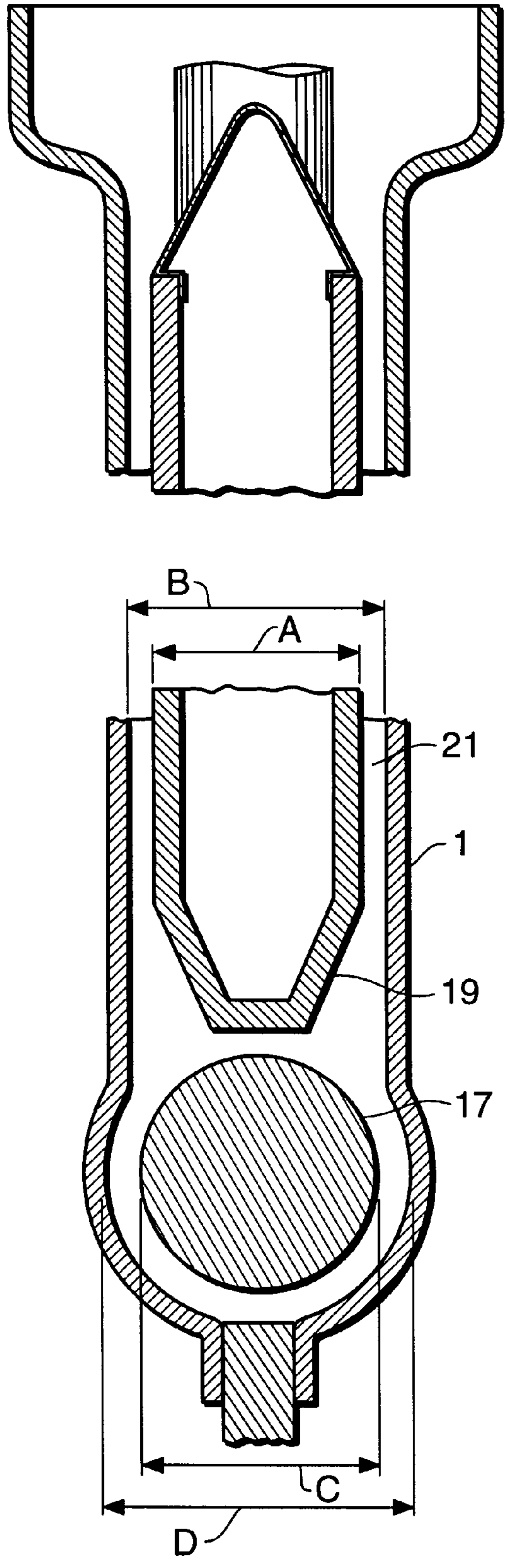
FIG. 7 is a schematic side view of a tank of a LVTT processing apparatus showing preferred relationships defining the processing channel of the apparatus.

As will be appreciated, the width of the processing channel 21 should be kept to a minimum, so that the smallest quantity of processing solution is required. With this in mind, with reference to FIG. 7 of the drawings, the difference between the internal width B of the tank 1 and the width A of the rack 19 should preferably be within the range 3 mm to 11 mm, more preferably 6.5 to 7 mm. Obviously, as the dimension A increases and the dimension B decreases, the volume of the processing channel 21 decreases. Further, the difference between the internal diameter D of the bulbous lower end of the tank 1 and the diameter C of the guide roller 57 should be preferably between 5 mm and 25 mm, most preferably between 8 mm and 10 mm.

Depending on the drag within a tank 1, it is possible to offer a range of clamping forces associated with the clip 33 by varying the opening of the claws 47. Although FIGS. 5A and 5B show a tight gripping position which has been found to de-clip reliably at the output end of the processing apparatus 3, the embodiment of FIGS. 5A,5B may be difficult to attach to the moving drive belt 53. In contrast, the clip 33 shown in FIG. 8 of the drawings has an ideal angle for the claws 47, which allows both easy engagement of the clip 33 on a drive belt 53 and removal therefrom. In this embodiment, shown in FIG. 8, the angle of the claws 47, $\alpha$, is defined to match the natural curvature of the drive belt 53 when the edges 59 of the drive belt 53 abut the inside corners of the claws 47. This curvature will, of course, depend on the width of the belt 53.

Figure 8:
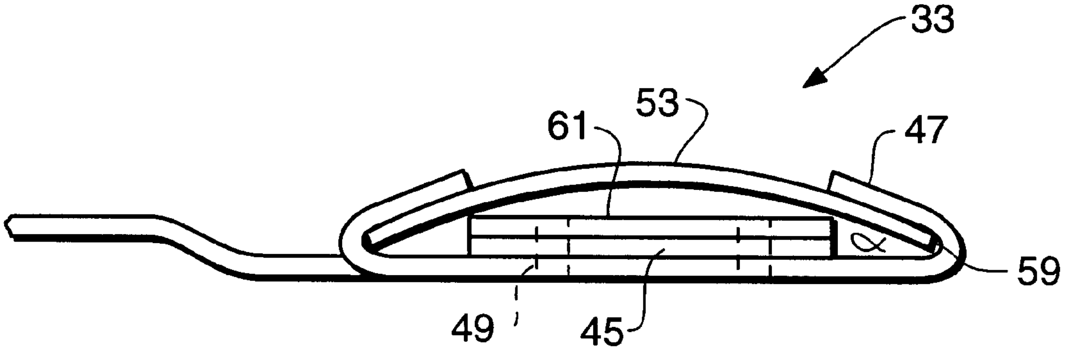
FIG. 8 is a side view of a part of a second embodiment of clip according to the present invention.

FIG. 8 also shows an alternative method of constructing the clip 33 which is narrower in total thickness than that shown in FIG. 5. In particular, rather than having the claws 47 mounted on the surface of the flexible support 45 which is opposite to the mounting surface for the elongate mount 35, the flexible support 45 is accommodated between the claws 47 of each pair. In this embodiment, reinforcing plates 61 are adjacent the openings between the claws 47, rather than being on the opposite side of the flexible support 45 as in the first embodiment. A more compact clip 33 results.

Although it is preferred that the flexible support 45 is manufactured from the same material as the drive belt 53, thereby enabling the drive belt 53 and the clip 33 to bend in a similar fashion during motion around a guide roller 57, additional holes 51 may be provided to ensure that the flexible support 45 is at least as flexible as the drive belt 53.

The processing apparatus as hereinbefore described is of the low volume thin tank type. That is, a relatively small amount of processing solution is allowed in the processing channel 21 and the recirculation system 23, 27. This is accomplished by providing a relatively narrow processing channel 21 and by minimizing the amount of processing solution passing through the recirculation system 23, 27. For the purposes of the present invention, a low volume thin tank processor is a processor wherein the ratio of the total volume of processing solution to the product of the maximum width of photographic material processed and the path length taken by the photographic material through the processing solution within the tank, is less than about 25 $dm/mm^2$. Preferably the ratio is less than about 11 $dm/mm^2$, and most preferably less than about 3 $dm/mm^2$.

The total volume of processing solution or tank volume is defined as the volume of the solution within the processing tank/channel of a processing stage together with that of the associated recirculation system, which includes, for example, pipework, valves, pumps, filter housings, etc.

The volume of the processing solution actually within the processing channel 21 is preferably such that it comprises at least 40% out of the total processing solution available in the processing channel 21 and recirculation system 23, 27. Preferably this ratio is at least 50%.

It will of course be understood that present invention has been described above purely by way of example, and that modifications of detail can be made within the scope of the invention.

What is claimed is:

1. A clip for attaching an end of a web to a drive belt, the clip comprising:

an elongate mount for receiving an end of the web, and an attachment section for securing the clip to the belt, the attachment section comprising two spaced pairs of claws for gripping the drive belt such that the drive belt and web are substantially parallel and a flexible support connecting the two spaced pairs of claws providing flexibility in a direction of travel, such that, in use, the flexible support can deform to conform to a path of the drive belt as the drive belt passes through a processing apparatus.

2. A clip as claimed in claim 1, wherein one end of the elongate mount is attached to the attachment section and the other end of the elongate mount is tapered and/or rounded.

3. A clip as claimed in claim 1, wherein the elongate mount is attached to the attachment section substantially midway between the two spaced pairs of claws.

4. A clip as claimed in claim 1, wherein the elongate mount is attached to the attachment section by studs passing through the attachment section which engage the elongate mount and a reinforcing plate.

5. A clip as claimed in claim 4, wherein the reinforcing plate is attached to one face of the flexible support and the claws extend in front of the other face of the flexible support.

6. A clip as claimed in claim 4, wherein the reinforcing plate is attached to one face of the flexible support and the claws extend in front of the same face of the flexible support.

7. A clip as claimed in claim 1, wherein the flexible support includes a row of apertures which increases a resiliency of the flexible support between the pairs of claws.

8. A clip as claimed in claim 1, wherein the claws are inclined from the flexible support.

9. A clip as claimed in claim 6, wherein the claws are inclined from the flexible support at an angle which corresponds, in use, substantially to an angle of bow of a drive belt which is carrying the clip.

10. A clip as claimed in claim 1, wherein the elongate mount includes a slot for receiving an end of a web.

11. A photographically sensitized web processing apparatus comprising at least one processing tank, guide means for guiding a drive belt and a web through the at least one processing tank, and a clip for attaching the web to the drive belt, the clip comprising an elongate mount for receiving an end of the web, and an attachment section for securing the clip to the belt, the attachment section comprising two spaced pairs of claws for gripping the drive belt such that the drive belt and web are substantially parallel and a flexible support connecting the two spaced pairs of claws providing flexibility in a direction of travel, such that, in use, the flexible support can deform to conform to a path of the drive belt as the drive belt passes through a processing apparatus.

12. An apparatus as claimed in claim 11, wherein a flexibility of the flexible support and a flexibility of the drive belt are substantially the same.

13. An apparatus as claimed in claim 11, wherein a material of the drive belt and a material of the flexible support are the same.

14. An apparatus as claimed in claim 11, wherein a rack supports the guide means and forms, with the at least one processing tank, a narrow processing channel for the web through the tank.

15. An apparatus as claimed in claim 14, wherein the processing channel is wider around the guide means.

16. An apparatus as claimed in claim 14, wherein nozzles for discharging processing solution into the at least one processing tank are provided and the processing channel is narrower adjacent the nozzles.

17. An apparatus as claimed in claim 16, wherein the nozzles are formed on the rack.

18. An apparatus as claimed in claim 11, wherein the guide means comprise rollers.

19. An apparatus as claimed in claim 14, wherein the drive belt runs in a groove formed in the rack or the tank.

20. An apparatus as claimed in claim 11, wherein the claws of the clip are inclined from the flexible support and a width of the drive belt is greater than an internal width of each pair of claws.

* * * * *